US006869587B2

(12) United States Patent
Dhingra et al.

(10) Patent No.: US 6,869,587 B2
(45) Date of Patent: Mar. 22, 2005

(54) CRYSTALLINE MOLECULAR SIEVE COMPOSITION MCM-65, ITS SYNTHESIS AND USE

(75) Inventors: Sandeep Singh Dhingra, Midland, MI (US); Charles T. Kresge, Midland, MI (US); Stephen G. Casmer, Bethlehem, PA (US)

(73) Assignee: ExxonMobil Chemical Patents Inc, Houston, TX (US)

( * ) Notice: Subject to any disclaimer, the term of this patent is extended or adjusted under 35 U.S.C. 154(b) by 0 days.

(21) Appl. No.: 10/465,960

(22) PCT Filed: Nov. 14, 2001

(86) PCT No.: PCT/US01/43849
§ 371 (c)(1),
(2), (4) Date: Jun. 27, 2003

(87) PCT Pub. No.: WO02/42208
PCT Pub. Date: May 30, 2002

(65) Prior Publication Data
US 2004/0047802 A1 Mar. 11, 2004

Related U.S. Application Data
(60) Provisional application No. 60/253,245, filed on Nov. 27, 2000.

(51) Int. Cl.[7] .................................................. C01B 39/48
(52) U.S. Cl. ....................... 423/706; 423/707; 423/718; 208/46
(58) Field of Search .................................. 423/706, 707, 423/718; 208/46

(56) References Cited

U.S. PATENT DOCUMENTS

| 4,376,757 A | | 3/1983 | Hinnenkamp et al. ....... 423/332 |
| 4,528,171 A | * | 7/1985 | Casci et al. .................. 423/705 |
| 4,855,270 A | * | 8/1989 | Haddad et al. ................ 502/64 |
| 4,954,325 A | * | 9/1990 | Rubin et al. ................. 423/706 |
| 4,985,223 A | | 1/1991 | Chu et al. .................... 423/328 |
| 5,063,037 A | | 11/1991 | Rubin ......................... 423/277 |
| 5,068,096 A | | 11/1991 | Valyocsik .................... 423/277 |

FOREIGN PATENT DOCUMENTS

| EP | 0 353 914 B1 | 2/1990 | ........... C01B/33/20 |
| EP | 0 356 082 B1 | 2/1990 | ............ B01J/20/18 |

* cited by examiner

Primary Examiner—David Sample

(57) ABSTRACT

This invention relates to a novel synthetic porous crystalline molecular sieve material, MCM-65, to a reaction mixture and method for its preparation, and to use of the MCM-65 in catalytic conversion of organic compounds. The crystalline material exhibits a distinctive X-ray diffraction pattern as shown in Table 1.

33 Claims, 4 Drawing Sheets

Illustrates the X-ray diffraction pattern of as-synthesized MCM-65 prepared in Example 1

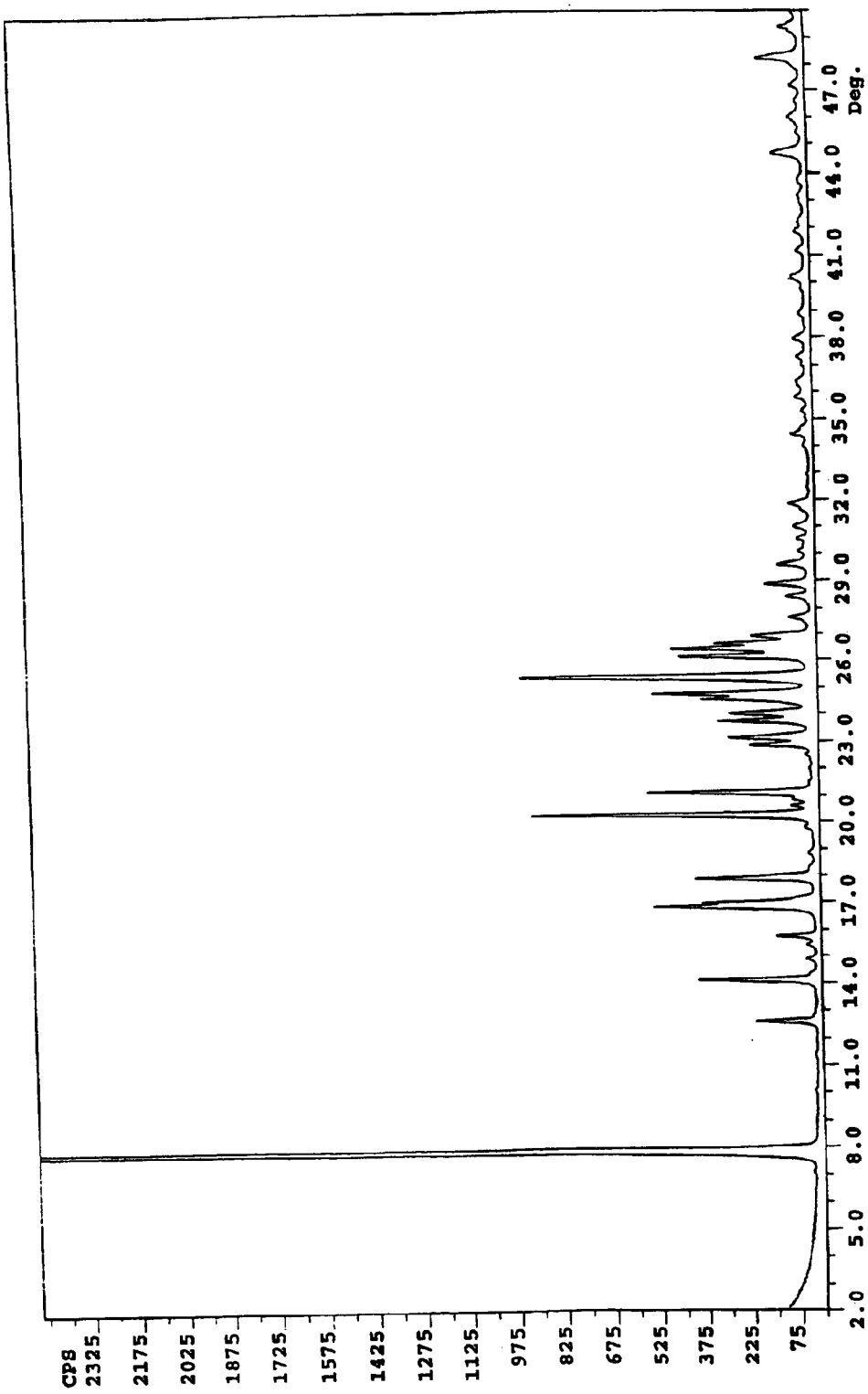
Figure 1. Illustrates the X-ray diffraction pattern of as-synthesized MCM-65 prepared in Example 1

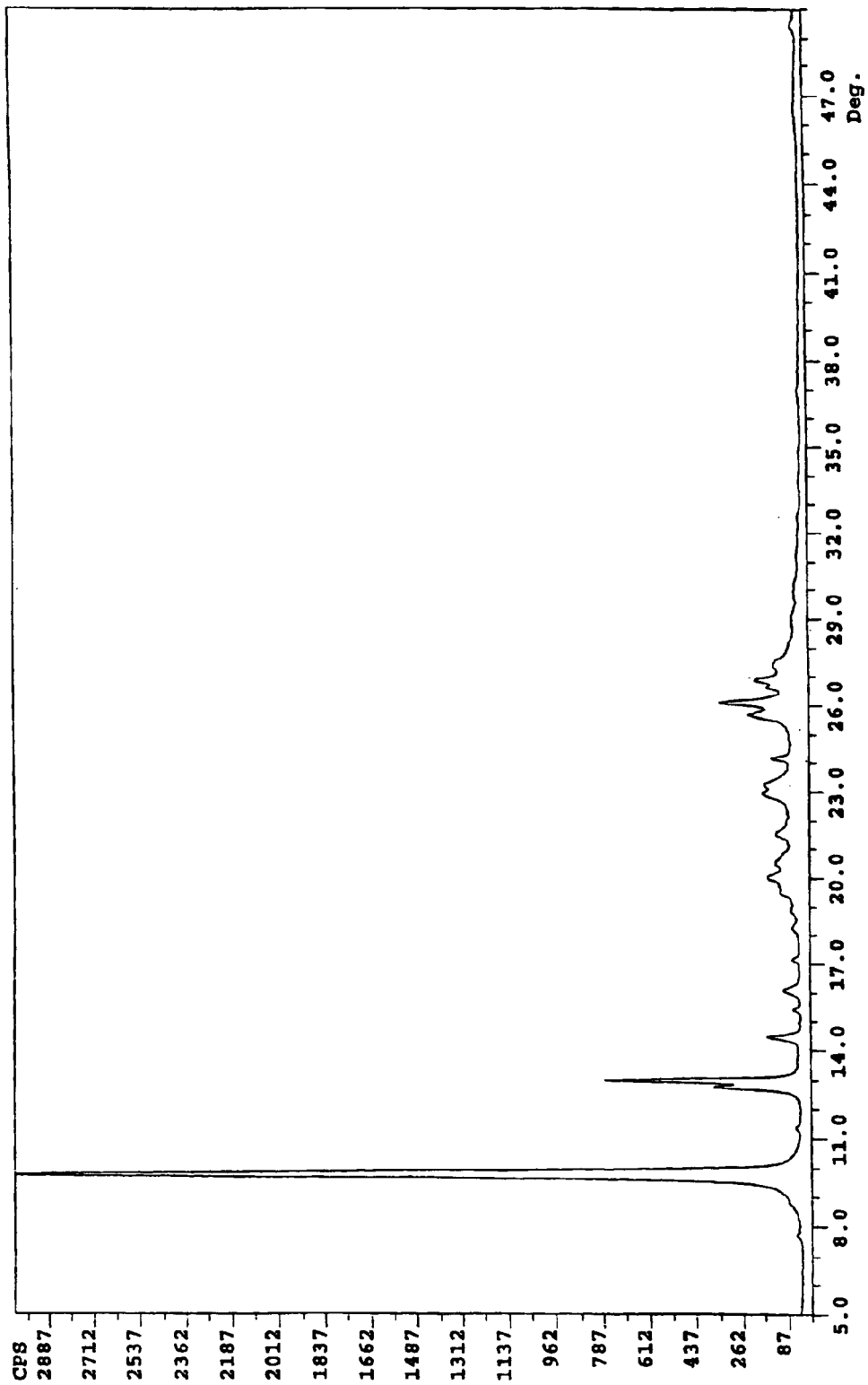
Figure 2. Illustrates the X-ray diffraction pattern of calcined MCM-65 prepared in Example 1

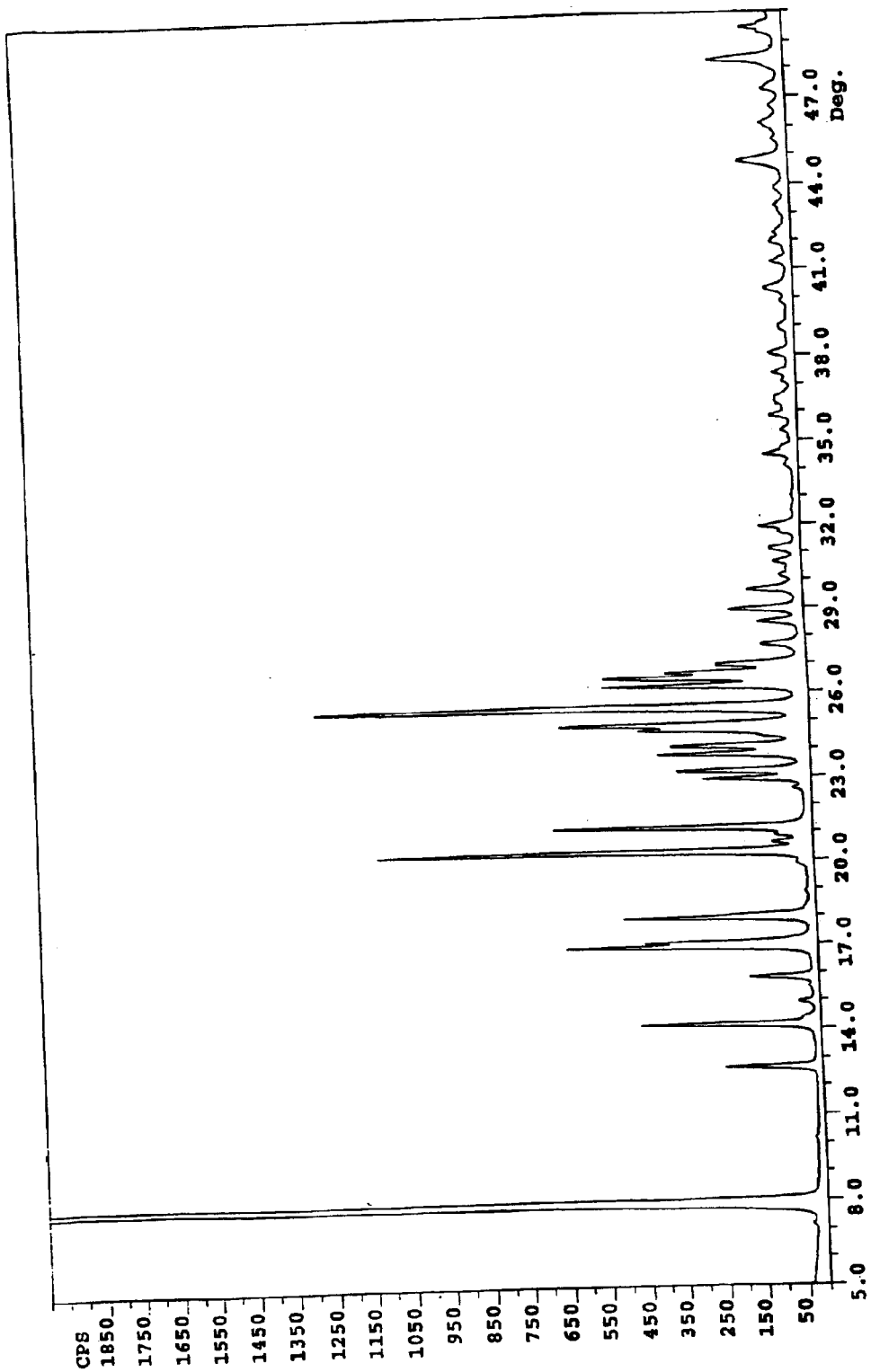
Figure 3. Is the X-ray diffraction pattern of as-synthesized MCM-65 prepared in Example 2

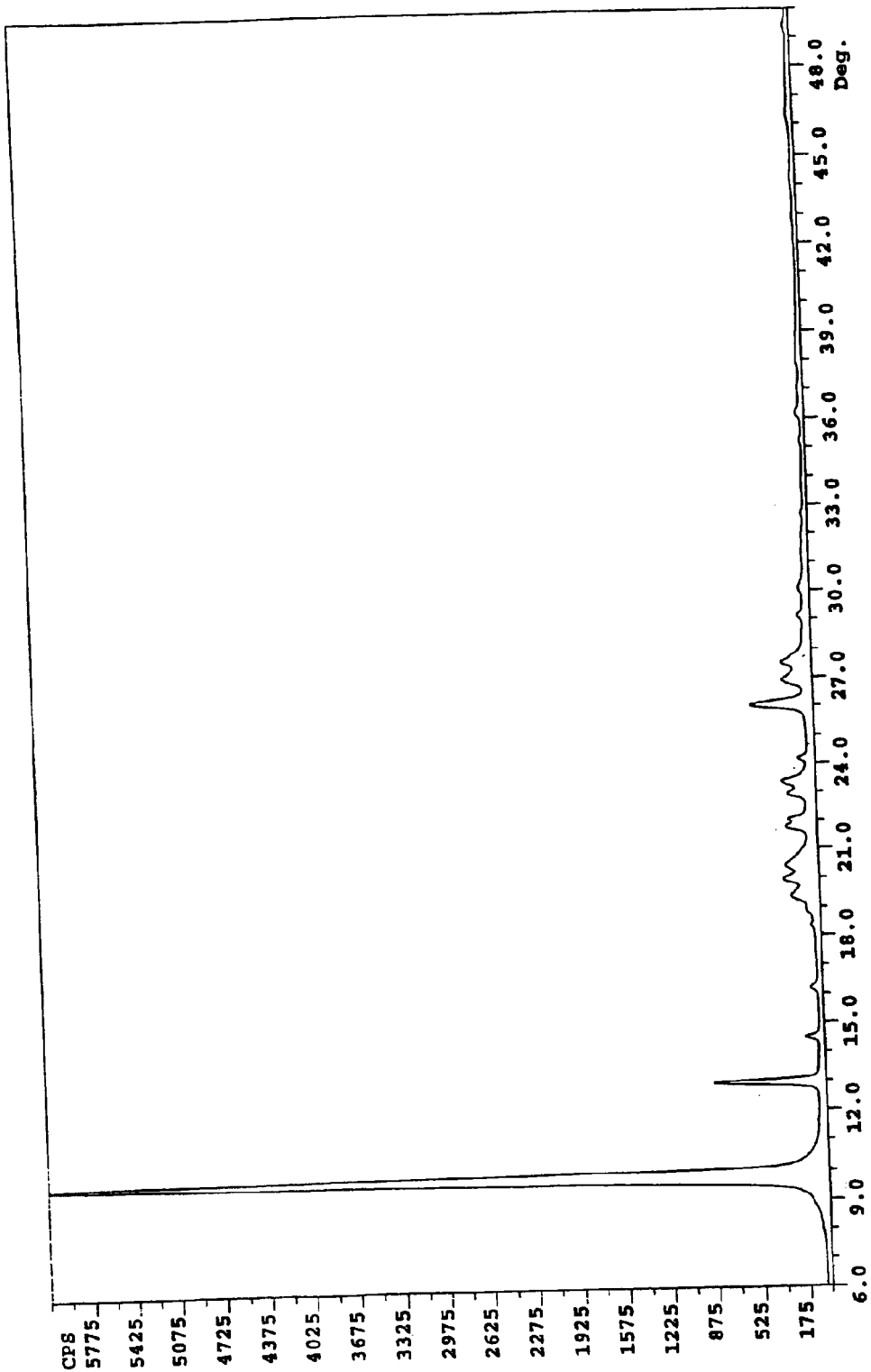
Figure 4. is the X-ray diffraction pattern of calcined MCM-65 prepared in Example 2

CRYSTALLINE MOLECULAR SIEVE COMPOSITION MCM-65, ITS SYNTHESIS AND USE

CROSS-REFERENCE TO RELATED APPLICATIONS

This application claims priority to application Ser. No. 60/253,245, filed Nov. 27, 2000, and PCT/US01/43849 filed Nov. 14, 2001, which are hereby incorporated by reference.

BACKGROUND OF THE INVENTION

1. Field of the Invention

This invention relates to a novel synthetic crystalline molecular sieve material, MCM-65, a process for its preparation and its use in hydrocarbon conversion.

2. Description of the Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Zeolites typically have uniform pore diameters of about 3 Angstrom to about 10 Angstrom. The chemical composition of zeolites can vary widely but they typically consist of $SiO_2$ in which some of the Si atoms may be replaced by tetravalent atoms such as Ti or Ge, by trivalent atoms such as Al, B, Ga, Fe, or by bivalent atoms such as Be, or by a combination thereof. When there is substitution by bivalent or trivalent atoms, cations such as Na, K, Ca, $NH_4$ or H are also present.

Zeolites include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal, an alkaline earth metal cation, or an organic species such as a quaternary ammonium cation. This can be expressed wherein the ratio of aluminum to the number of various cations, such as Ca/2, Sr/2, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are usually occupied by molecules of water prior to dehydration.

Prior art techniques have resulted in the formation of a great variety of synthetic aluminosilicates. These aluminosilicates have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), and zeolite ZSM-12 (U.S. Pat. No. 3,832,449).

The ZSM-52 and its boron-containing analog, ZSM-55, are described in U.S. Pat. Nos. 4,985,223 and 5,063,037 respectively.

U.S. Pat. No. 4,637,923 describes the porous crystalline material MCM-47 and its synthesis from a reaction mixture containing a diethylated, linear diquatemary ammonium compound as the directing agent. U.S. Pat. No. 5,068,096 discloses a method for preparing MCM-47 using bis (methylpyrrolidinium)-DIQUAT-4 as the directing agent. Accordingly, the synthesis of zeolite MCM-47 has required long dimeric templates containing diquaternary ammonium compounds.

In contrast, the present invention utilizes a monomeric directing agent rather than dimeric diquat agents, and provides a new crystalline material that has excellent porosity and much improved thermal stability.

SUMMARY OF THE INVENTION

The present invention is directed to a novel synthetic crystalline molecular sieve composition, named MCM-65, comprising a crystal having a framework topology characterized by a distinctive X-ray diffraction pattern substantially as set forth in Table 1 below.

In addition, the invention resides in a process for the synthesis of MCM-65, and to the use of MCM-65 in catalytic conversion of organic compounds, e.g., hydrocarbon compounds.

BRIEF DESCRIPTION OF THE DRAWINGS

FIG. 1 illustrates the X-ray diffraction pattern of as-synthesized MCM-65 prepared in Example 1;

FIG. 2 illustrates the X-ray diffraction pattern of calcined MCM-65 prepared in Example 1;

FIG. 3 is the X-ray diffraction pattern of as-synthesized MCM-65 prepared in Example 2; and FIG. 4 is the X-ray diffraction pattern of calcined MCM-65 prepared in Example 2.

DETAILED DESCRIPTION OF THE PRESENT INVENTION

The synthetic porous crystalline material of this invention, MCM-65, is a single crystalline phase which, in its calcined form, has an X-ray diffraction pattern which is distinguished from the patterns of other known as-synthesized or thermally treated crystalline materials by the lines listed in Table 1 below.

TABLE 1

| d-spacing (Å) | Relative Intensity |
|---|---|
| 8.98 ± 0.25 | vs |
| 6.92 ± 0.20 | w-m |
| 6.81 ± 0.42 | m-s |
| 6.11 ± 0.34 | vw |
| 3.46 ± 0.11 | vw-w |
| 3.40 ± 0.22 | vw-w |
| 1.84 ± 0.14 | vw |

These X-ray diffraction data were collected with a Scintag diffraction system, equipped with a germanium solid state detector, using copper K-alpha radiation. The diffraction data were recorded by step-scanning at 0.02 degrees of two-theta, where theta is the Bragg angle, and a counting time of 10 seconds for each step. The interplanar spacing, d's, were calculated in Angstrom units, and the relative intensities of the lines, $I/I_0$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (80–100), s=strong (60–80), m=medium (40–60), w=weak (20–40), vw=very weak (0–20). It should be understood that diffraction data listed for this sample as single lines may consist of multiple overlapping lines which under certain conditions, such as differences in crystallographic changes, may appear as resolved or partially resolved lines. Typically, crystallographic changes can include minor changes in unit cell parameters and/or a change in crystal symmetry, without a change in the structure. These minor effects, including changes in relative intensities, can also occur as a result of differences in cation content, framework composition, nature and degree of pore filling, crystal size and shape, preferred orientation and thermal and/or hydrothermal history.

In its as-synthesized form, MCM-65 has an X-ray diffraction pattern which is similar to that of MCM-47, but the peak intensities are different. Upon calcination, the as-synthesized material transforms into MCM-65 having a distinctive X-ray diffraction pattern including the lines of Table 1. In addition, MCM-47 is not thermally stable, whereas MCM-65 of the present invention is thermally stable.

The porous crystalline material MCM-65 has a composition involving the molar relationship:

$$X_2O_3 : y(YO_2)$$

wherein X is a trivalent element, such as aluminum, boron, iron, indium and/or gallium, preferably aluminum; Y is a tetravalent element, such as silicon, tin and/or germanium, preferably silicon; and y is at least about 200, usually from about 400 to greater than about 3000, more usually from about 500 to about 3000.

The MCM-65 can be synthesized in a relatively wide range of $X_2O_3/YO_2$ mole ratios in the presence of combined quinuclidine and tetramethylammonium organic directing agent. In the synthesized form, the crystalline material has a composition, in terms of moles of anhydrous oxides per 100 moles of tetravalent element oxide as follows:

(0–20)R'$_2$O:(0–20)R"$_2$O:(0 to 5)(0 to 20)M$_{2/n}$O:(0 to 2)X$_2$O$_3$:(100)YO$_2$ wherein X and Y are as defined above, M is an alkali or alkaline earth metal, n is the valence of M, and R' and R" are the directing agents tetramethyl ammonium hydroxide (TMAOH) and quinuclidine, respectively.

The original alkali or alkaline earth metal cations of the as synthesized crystalline material can be replaced with another cation in accordance with techniques well known in the art, at least in part, by ion exchange with other cations. Preferred replacing cations include metal ions, hydrogen ions, hydrogen precursors, e.g., ammonium, ions and mixtures thereof. Particularly preferred cations are those which render the new zeolite catalytically active, especially for hydrocarbon conversion. These include hydrogen, rare earth metals and metals of Groups 2, 3, 4, 6, 9, 11, 12, 13, and 14 of the Periodic Table (New Notation). A typical ion exchange technique would be to contact the synthetic zeolite with an aqueous solution of a salt of the desired replacing cation or cations. Examples of such salts include the halides, e.g., chloride, nitrates and sulfates.

The crystalline material of the invention may be subjected to treatment to remove part or all of the organic constituents. This conveniently effected by thermal treatment in which the as-synthesized material is calcined at a temperature of at least about 370° C. for at least 1 minute and generally not longer than 20 hours. While subatmospheric pressure can be employed for the calcination, atmospheric pressure is desired for reasons of convenience. The calcination can be performed at a temperature up to about 925° C., preferably from about 450° C. to about 700° C. The calcined product, especially in its metal, hydrogen and ammonium forms, is particularly useful in the catalysis of certain organic, e.g., hydrocarbon, conversion reactions.

The crystalline material of this invention, when employed either as an adsorbent or as a catalyst in an organic compound conversion process should be dehydrated, at least partially. This can be done by heating to a temperature in the range of 200° C. to about 370° C. in an atmosphere such as air, nitrogen, etc., and at atmospheric, subatmospheric or superatmospheric pressures for between 30 minutes and 48 hours. Dehydration can also be performed at room temperature merely by placing the MCM-65 in a vacuum, but a longer time is required to obtain a sufficient amount of dehydration.

The MCM-65 of the present invention can be prepared from a reaction mixture containing water and sources of an alkali or alkaline earth metal oxide (M), an oxide of trivalent element (X), an oxide of tetravalent element (Y), and the directing agents tetramethyl ammonium hydroxide (R') and quinuclidine (R"). The reaction mixture, in terms of mole ratios of oxides, preferably has the following composition ranges:

| Reactants | Useful | Preferred |
| --- | --- | --- |
| $YO_2/X_2O_3$ | 10 to ∞ | 300 to ∞ |
| $H_2O/YO_2$ | 5 to 1000 | 10 to 200 |
| $OH^-/YO_2$ | 0.1 to 2.0 | 0.20–1.00 |
| $M_{2/n}/YO_2$ | 0.05 to 2.0 | 0.10 to 0.80 |
| R'/Y | 0.05 to 2.0 | 0.2 to 1.0 |
| R"/Y | 0.05 to 2.0 | 0.2 to 1.0 |

The crystallization is carried out under either static or stirred conditions, e.g., in an autoclave or static bomb reactor, at a temperature from about 80 to about 220° C., more preferably from about 160° C. to about 180° C., for a time sufficient for crystallization to occur at the temperature used, e.g., from about 24 hrs to about 30 days; more preferably about 96 hrs to about 120 hrs. Thereafter, the crystals are separated from the liquid and recovered. The composition can be prepared utilizing materials which supply the appropriate oxide. Such compositions include sodium silicate, silica hydrosol, silica gel, silicic acid, sodium hydroxide, sodium chloride, aluminum sulfate, sodium aluminate, aluminum oxide, or aluminum itself.

Synthesis of the new crystals is facilitated by the presence of at least 0.001 percent, preferably 0.10 percent and more preferably 1 percent, seed crystals (based on total weight) of crystalline product.

The calcined MCM-65 has a surface area of from about 100 to about 250 m$^2$/g, more typically from about 166 to about 199 m$^2$/g, which is indicative of a porous material. In one embodiment, the material has an alpha value of 6 as determined by the hexane cracking test. The Alpha Test is described, e.g., in U.S. Pat. No. 3,354,078 and the *Journal of Catalysis,* 4:527(1965); 6:278(1966) and 61:395(1980). Test conditions include a constant temperature of 538° C. and a variable flow rate as described in *Journal of Catalysis.* 61:395.

The composition prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

As in the case of many catalysts it may be desired to incorporate the MCM-65 of the present invention with another material resistant to the temperatures and other conditions employed in organic conversion processes. Such materials include active and inactive materials and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the composition of the present invention, i.e., combined therewith which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally-occurring clays, e.g., bentonite and kaolin, to improve the crush strength of the catalyst under commercial operating conditions. Such material, i.e., clays, oxides, etc., function as binders or matrix for the catalyst. It is desirable to provide a catalyst having good crush strength because in a petroleum refinery the catalyst is often subjected to rough handling, which tends to break the catalyst down into powder-like materials, which cause problems in processing. These clay binders have been employed normally only for the purpose of improving the crush strength of the catalyst. It is desirable to provide a catalyst having good crush strength because in a petroleum refinery the catalyst is often subjected to rough handling, which tends to break the catalyst down into powder-like materials which cause problems in processing.

Naturally-occurring clays which can be composited with the crystal of the present invention include montmorillonite and kaolin families. These families include subbentonites, and kaolins commonly known as Dixie, McNamee, Georgia and Florida clays or others in which the main mineral constituent is hallyosite, kaolinite, dickite, nacrite, or anauxite. Such clays can be used in the raw state as originally mined or initially subjected to calcination, acid treatment or chemical modification. Binders useful for compositing with the crystal of the present invention also include inorganic oxides, notably alumina.

In addition to the foregoing materials, the aluminosilicate molecular sieve of the present invention can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zircorna.

Catalyst compositions containing the material of the invention will generally comprise from about 1% to 90% by weight of MCM-65 and from about 10% to 99% by weight of the binder or matrix material. More preferably, such catalyst compositions will comprise from about 2% to 80% by weight of MCM-65 and from about 20% to 98% by weight of the matrix.

The MCM-65 crystalline molecular sieve of the present invention can also be used as a catalyst in intimate combination with an additional hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be exchanged into the composition, to the extent as in the structure, impregnated therein or physically intimately admixed therewith. Such component can be impregnated in or onto it such as, for example, by, in the case of platinum, treating the crystal with a solution comprising platinum metal-containing ions. Thus, suitable platinum compounds include chloroplatinic acid, platinous chloride and various compounds containing the platinum amine complex.

Employing a catalytically active form of the composition of this invention which contains a hydrogenation component, reforming stocks can be reformed employing a temperature from about 300° C. to about 600° C. The pressure can be from about 100 to about 1,000 psig but is preferably from about 200 to about 700 psig. The liquid hourly space velocity is generally from about 0.1 to about 10, preferably from about 0.5 to about 4, and the hydrogen to hydrocarbon mole ratio is generally from about 1 to about 20, preferably from about 4 to about 12.

The catalyst made from the zeolite of the present invention can also be used for reducing the pour point of gas oils. This reduction is carried out at a liquid hourly space velocity between about 10 and about 30 and a temperature between about 400° C. and about 600° C.

Other reactions which can be accomplished employing the catalyst made from the zeolite of this invention with or without a metal, e.g., platinum, or palladium, include hydrogenation-dehydrogenation reactions and desulfurization reactions, olefin polymerization (oligomerization), aromatic alkylation with $C_2$–$C_{12}$ olefins or with $C_1$–$C_{12}$ alcohols, isomerization of olefins and aromatics, disproportionation and transalkylation of alkylaromatics and other organic compound conversions such as the conversion of alcohols (e.g., methanol) to hydrocarbons.

The following non-limiting examples further illustrate the present invention.

EXAMPLE 1

35 g of colloidal silica (30 wt. % $SiO_2$), $Al(OH)_3$, NaOH (20 wt. % solution), quinuclidine (solid), TMAOH (25 wt. % solution) and distilled water were combined in the following molar ratios:

| | |
|---|---|
| Si/$Al_2$ | 500 |
| $H_2O$/Si | 30 |
| OH/Si | 0.35 |
| Na/Si | 0.15 |
| TMAOH/Si | 0.2 |
| Quinuclidine/Si | 0.2 |

The combined mixture was added to a stirred autoclave and heated to 180° C. at 100 rpm for 96 hours. The product was then filtered and washed with water. The as-synthesized material was calcined at a temperature of 540° C. to yield the new material designed as MCM-65. The powder patterns of the as-synthesized and calcined materials are given in FIGS.

1 and 2 respectively. The surface area of the resultant crystalline material was 199 m²/g.

EXAMPLE 2

35 g of colloidal silica (30 wt. % $SiO_2$), $Al(OH)_3$, NaOH (20 wt. % solution), quinuclidine, TMAOH (25 wt. % solution) and distilled water were combined in the following molar ratios:

| | |
|---|---|
| $Si/Al_2$ | 2000 |
| $H_2O/Si$ | 30 |
| OH/Si | 0.35 |
| Na/Si | 0.15 |
| TMAOH/Si | 0.20 |
| Quinuclidine/Si | 0.20 |

The combined mixture was added to a stirred autoclave and heated to 180° C. at 100 rpm for 96 hours. The product was then filtered and washed with water. The as-synthesized material was calcined at a temperature of 540° C. to yield the new material designated as MCM-65. The powder patterns of the as-synthesized and calcined materials are given in FIGS. 3 and 4, respectively. The surface area of the resultant crystalline material was 166 m²/g.

Table 2 lists the relative intensities of the peaks in the powder pattern for the calcined material MCM-65 of Examples 1 and 2.

TABLE 2

| d-spacing | $I/I_o \times 100$ |
|---|---|
| EXAMPLE 1 | |
| 8.98 | 100 |
| 6.92 | 31 |
| 6.81 | 61 |
| 6.11 | 9 |
| 5.48 | 4 |
| 4.85 | 2 |
| 4.48 | 1 |
| 4.40 | 4 |
| 4.10 | 4 |
| 3.86 | 5 |
| 3.82 | 4 |
| 3.68 | 7 |
| 3.46 | 12 |
| 3.40 | 16 |
| 3.34* | 1 |
| 3.30 | 6 |
| 3.22 | 1 |
| 1.84 | 2 |
| EXAMPLE 2 | |
| 9.13** | 100 |
| 6.94 | 30 |
| 6.82 | 67 |
| 6.13 | 10 |
| 5.51 | 3 |
| 4.87 | 3 |
| — | — |
| 4.43 | 2 |
| 4.11 | 2 |
| 3.88 | 4 |
| 3.83 | 4 |
| 3.68 | 8 |
| 3.48 | 9 |
| 3.41 | 19 |
| 3.34 | 7 |
| 3.31 | 8 |

TABLE 2-continued

| d-spacing | $I/I_o \times 100$ |
|---|---|
| 3.25 | 2 |
| 1.84 | 1 |

*peak may be quartz or enhanced by quartz
**peak may be partially resolved doublet

We claim:

1. A synthetic porous crystalline material having an X-ray pattern including d-spacing and relative intensity values essentially as set forth in the following table:

| d-spacing (Å) | Relative Intensity |
|---|---|
| 8.98 | vs |
| 6.92 | w-m |
| 6.81 | m-s |
| 6.11 | vw |
| 3.46 | vw-w |
| 3.40 | vw-w |
| 1.84 | vw. |

2. The crystalline material of claim 1 having a composition comprising the molar relationship $$X_2O_3{:}(y)YO_2,$$

wherein y is at least about 200, X is a trivalent element, and Y tetravalent element.

3. The crystalline material of claim 1 having a composition, on an anhydrous basis and in terms of moles of oxides per 100 moles of tetravalent element oxide as follows:

$$(0-20)R'_2O{:}(0-20)R''_2O{:}(0 \text{ to } 5)(0 \text{ to } 20)M_{2/n}O{:}(0 \text{ to } 2)X_2O_3{:}(100)YO_2$$

wherein M is an alkali or alkaline earth metal, n is the valence of M, and R' and R" are tetramethyl ammomium hydroxide (TMAOH) and quinuclidine, respectively.

4. The crystlline material of claim 2 wherein X is a trivalent element selected from the group consisting of aluminum, boron, iron, indium, gallium and a combination thereof; and Y is a tetravalent element selected from the group consisting of silicon, tin, titanium, germanium, and a combination thereof.

5. The crystalline material of claim 2 wherein X comprises aluminium and Y comprises silicon.

6. A method of preparing the crystalline material of claim 1 which comprises:

(a) preparing a reaction mixture capable of forming said material and mixture comprising sources of tetravalent element (Y) oxide, trivalent element (X) oxide, alkali or alkaline earth metal (M), organic directing agents R' and R", and water, said reaction mixture, in terms of mole ratios, having the following composition:

| | |
|---|---|
| $YO_2/X_2O_3$: | 10 to ∞, |
| $H_2O/YO_2$: | 5 to 1000, |
| $OH^-/YO_2$: | 0.1 to 2, |
| $M_{2/n}/YO_2$: | 0.05 to 2, |
| R'/Y: | 0.05 to 2, and |
| R"/Y: | 0.05 to 2 | wherein n is the valence of the alkali or alkaline earth metal M, and R' and R" are quinuclidine and tetramethylammonium respectively; and (b) maintaining said mixture under crystallization conditions until crystals of said crystalline material are formed.

7. The method according to claim 6, wherein said reaction mixture comprises the following composition ranges:

| | |
|---|---|
| $YO_2/X_2O_3$: | 300 to ∞, |
| $H_2O/YO_2$: | 10 to 200, |
| $OH^-/YO_2$: | 0.2 to 1, |
| $M_{2/n}/YO_2$: | 0.1 to 0.8, |
| R'/Y: | 0.2 to 1, and |
| R"/Y: | 0.2 to 1. |

8. A process for catalytic conversion of a hydrocarbon containing feedstock which comprises contacting said feedstock under catalytic conversion conditions with a catalyst comprising an active form of the crystalline material of claim 1.

9. A synthetic porous crystalline material having an X-ray pattern including 2 theta, d-spacing and relative intensity values essentially as set forth in the following table:

| d-spacing (Å) | Relative Intensity |
|---|---|
| 8.98 ± 0.1 | vs |
| 6.92 ± 0.05 | w-m |
| 6.81 ± 0.05 | m-s |
| 6.11 ± 0.04 | vw |
| 3.46 ± 0.01 | vw-w |
| 3.40 ± 0.01 | vw-w |
| 1.84 ± 0.003 | vw. |

10. The crystalline material of claim 9 having a composition comprising the molar relationship $$X_2O_3:(y)YO_2,$$

wherein y is at least about 200, X is a trivalent element, and Y is a tetravalent element.

11. The crystalline material of claim 9 having a composition, on an anhydrous basis and in terms of moles of oxides per 100 moles of tetravalent element oxide as follows:

$$(0-20)R'_2O:(0-20)R''_2O:(0 \text{ to } 5)(0 \text{ to } 20)M_{2/n}O:(0 \text{ to } 2)X_2O_3:(100)YO_2$$

wherein M is an alkali or alkaline earth metal, n is the valence of M, and R' and R" are tetramethyl ammonium hydroxide (TMAOH) and quinuclidine, respectively.

12. The crystalline material of claim 10 wherein X is a trivalent element selected from the group consisting of aluminum, boron, iron, indium, gallium and a combination thereof; and Y is a tetravalent element selected from the group consisting of silicon, tin, titanium, germanium, and a combination thereof.

13. The crystalline material of claim 10 wherein X comprises aluminium and Y comprises silicon.

14. A method of preparing the crystalline material of claim 9 which comprises:

(a) preparing a reaction mixture capable of forming said material and mixture comprising sources of tetravalent element (Y) oxide, trivalent element (X) oxide, alkali or alkaline earth metal (M), organic directing agents R' and R", and water, said reaction mixture, in terms of mole ratios, having the following composition:

| | |
|---|---|
| $YO_2/X_2O_3$: | 10 to ∞, |
| $H_2O/YO_2$: | 5 to 1000, |
| $OH^-/YO_2$: | 0.1 to 2, |
| $M_{2/n}/YO_2$: | 0.05 to 2, |
| R'/Y: | 0.05 to 2, and |
| R"/Y: | 0.05 to 2 | wherein n is the valence of the alkali or alkaline earth metal M, and R' and R" are quinuclidine and tetramethylammonium respectively; and (b) maintaining said mixture under crystallization conditions until crystals of said crystalline material are formed.

15. The method according to claim 14, wherein said reaction mixture comprises the following composition ranges:

| | |
|---|---|
| $YO_2/X_2O_3$: | 300 to ∞, |
| $H_2O/YO_2$: | 10 to 200, |
| $OH^-/YO_2$: | 0.2 to 1, |
| $M_{2/n}/YO_2$: | 0.1 to 0.8, |
| R'/Y: | 0.2 to 1, and |
| R"/Y: | 0.2 to 1. |

16. A process for catalytic conversion of a hydrocarbon containing feedstock which comprises contacting said feedstock under catalytic conversion conditions with a catalyst comprising an active form of the crystalline material of claim 9.

17. A calcined synthetic porous crystalline material having an X-ray pattern including d-spacing and relative intensity values essentially as set forth in Table 2 of specification.

18. The crystalline material of claim 17 having a composition comprising the molar relationship $$X_2O_3:(y)YO_2,$$

wherein y is at least about 200, X is a trivalent element, and Y is a tetravalent element.

19. The crystalline material of claim 17 having a composition, on an anhydrous basis and in terms of moles of oxides per 100 moles of tetravalent element oxide as follows:

$$(0-20)R'_2O:(0-20)R''_2O:(0 \text{ to } 5)(0 \text{ to } 20)M_{2/n}O:(0 \text{ to } 2)X_2O_3:(100)YO_2$$

wherein M is an alkali or alkaline earth metal, n is the valence of M, and R' and R" are tetramethyl ammonium hydroxide (TMAOH) and quinuclidine, respectively.

20. The crystalline material of claim 18 wherein X is a trivalent element selected from the group consisting of aluminum, boron, iron, indium, gallium and a combination thereof; and Y is a tetravalent element selected from the group consisting of silicon, tin, titanium, germanium, and a combination thereof.

21. The crystalline material of claim 18 wherein X comprises aluminium and Y comprises silicon.

22. A method of preparing the crystalline material of claim 17 which comprises:

(a) preparing a reaction mixture capable of forming said material and mixture comprising sources of tetravalent element (Y) oxide, trivalent element (X) oxide, alkali or alkaline earth metal (M), organic directing agents R' and R", and water, said reaction mixture, in terms of mole ratios, having the following composition:

| | |
|---|---|
| $YO_2/X_2O_3$: | 10 to ∞, |
| $H_2O/YO_2$: | 5 to 1000, |
| $OH^-/YO_2$: | 0.1 to 2, |
| $M_{2/n}/YO_2$: | 0.05 to 2, |
| R'/Y: | 0.05 to 2, and |
| R"/Y: | 0.05 to 2 | wherein n is the valence of the alkali or alkaline earth metal M, and R' and R" are quinuclidine and tetramethylammonium respectively; and (b) maintaining said mixture under crystallization conditions until crystals of said crystalline material are formed.

23. The method according to claim 22, wherein said reaction mixture comprises the following composition ranges:

| | |
|---|---|
| $YO_2/X_2O_3$: | 300 to ∞, |
| $H_2O/YO_2$: | 10 to 200, |
| $OH^-/YO_2$: | 0.2 to 1, |
| $M_{2/n}/YO_2$: | 0.1 to 0.8, |
| R'/Y: | 0.2 to 1, and |
| R"/Y: | 0.2 to 1. |

24. A process for catalytic conversion of a hydrocarbon containing feedstock which comprises contacting said feedstock under catalytic conversion conditions with a catalyst comprising an active form of the crystalline material of claim 17.

25. A calcined synthetic porous crystalline material having an X-ray pattern including d-spacing and relative intensity essentially as shown in FIG. 2 or FIG. 4 of specification.

26. The crystalline material of claim 25 having a composition comprising the molar relationship

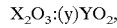

$X_2O_3$:(y)$YO_2$, wherein y is at least about 200, X is a trivalent element, and Y is a tetravalent element.

27. The crystalline material of claim 25 having a composition, on an anhydrous basis and in terms of moles of oxides per 100 moles of tetravalent element oxide as follows:

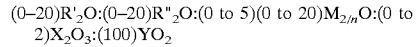

(0–20)R'$_2$O:(0–20)R"$_2$O:(0 to 5)(0 to 20)M$_{2/n}$O:(0 to 2)X$_2$O$_3$:(100)YO$_2$ wherein M is an alkali or alkaline earth metal, n is the valence of M, and R' and R" are tetramethyl ammonium hydroxide (TMAOH) and quinuclidine respectively.

28. The crystalline material of claim 26 wherein X is a trivalent element selected from the group consisting of aluminum, boron, iron, indium, gallium and a combination thereof; and Y is a tetravalent element selected from the group consisting of silicon, tin, titanium, germanium, and a combination thereof.

29. The crystalline material of claim 26 wherein X comprises aluminium and Y comprises silicon.

30. A method of preparing the crystalline material of claim 25 which comprises:

(a) preparing a reaction mixture capable of forming said material and mixture comprising sources of tetravalent element (Y) oxide, trivalent element (X) oxide, alkali or alkaline earth metal (M), organic directing agents R' and R", and water, said reaction mixture, in terms of mole ratios, having the following composition:

| | |
|---|---|
| $YO_2/X_2O_3$: | 10 to ∞, |
| $H_2O/YO_2$: | 5 to 1000, |
| $OH^-/YO_2$: | 0.1 to 2, |
| $M_{2/n}/YO_2$: | 0.05 to 2, |
| R'/Y: | 0.05 to 2, and |
| R"/Y: | 0.05 to 2 | wherein n is the valence of the alkali or alkaline earth metal M, and R' and R" are quinuclidine and tetramethylammonium respectively; and (b) maintaining said mixture under crystallization conditions until crystals of said crystalline material are formed.

31. The method according to claim 30, wherein said reaction mixture comprises the following composition ranges:

| | |
|---|---|
| $YO_2/X_2O_3$: | 300 to ∞, |
| $H_2O/YO_2$: | 10 to 200, |
| $OH^-/YO_2$: | 0.2 to 1, |
| $M_{2/n}/YO_2$: | 0.1 to 0.8, |
| R'/Y: | 0.2 to 1, and |
| R"/Y: | 0.2 to 1. |

32. A process for catalytic conversion of a hydrocarbon containing feedstock which comprises contacting said feedstock under catalytic conversion conditions with a catalyst comprising an active form of the crystalline material of claim 25.

33. An as-synthesized synthetic porous crystalline material having an X-ray pattern including d-spacing and relative intensity essentially as shown in FIG. 1 or FIG. 3 of specification.

* * * * *